United States Patent
Maruko

(10) Patent No.: US 7,033,407 B2
(45) Date of Patent: Apr. 25, 2006

(54) METHOD FOR INTERNAL HEATING REFORMATION BY OXIDATION

(75) Inventor: Saburo Maruko, Kanagawa (JP)

(73) Assignee: Nippon Chemical Plant Consultant Co., Ltd., Tokyo (JP)

( * ) Notice: Subject to any disclaimer, the term of this patent is extended or adjusted under 35 U.S.C. 154(b) by 0 days.

(21) Appl. No.: 11/093,382

(22) Filed: Mar. 30, 2005

(65) Prior Publication Data

US 2005/0178064 A1    Aug. 18, 2005

Related U.S. Application Data

(62) Division of application No. 10/204,199, filed as application No. PCT/JP01/01136 on Feb. 16, 2001, now Pat. No. 6,911,187.

(30) Foreign Application Priority Data

Mar. 3, 2000    (JP) .............................. P2000-58483

(51) Int. Cl.
*B01J 8/00*    (2006.01)

(52) U.S. Cl. ...................... 48/127.9; 48/94; 48/197 R; 422/129; 422/136; 422/209; 422/211; 431/346; 431/354

(58) Field of Classification Search ................ 431/346, 431/354; 422/129, 209, 136, 211; 48/94, 48/197, 127.9

See application file for complete search history.

(56) References Cited

FOREIGN PATENT DOCUMENTS

| EP | 0 922 666 A | 6/1999 |
|---|---|---|
| JP | 10-167701 A | 6/1998 |
| JP | 11-92102 A | 4/1999 |
| JP | 2000-257837 A | 9/2000 |

*Primary Examiner*—Glenn Caldarola
*Assistant Examiner*—Vinit H. Patel
(74) *Attorney, Agent, or Firm*—Frishauf, Holtz, Goodman & Chick,P.C.

(57) ABSTRACT

A method of producing hydrogen by reforming a hydrocarbon or an aliphatic alcohol. The method includes preparing a columnar catalytic member having many axial passages and containing a reforming catalyst, a shift catalyst and an oxidation catalyst; preparing a reformable gas containing a hydrocarbon or an aliphatic alcohol and water vapor mixed together; rotating the columnar catalytic member, while passing the gas therethrough transversely with respect to its cross-section such that the gas first flows along a forward path extending in one direction through a first portion of the axial passages and then flows along a backward path extending in the other direction through a second portion of the axial passages, thereby causing the gas to undergo reforming and shift reactions to form hydrogen for recovery, while the gas makes a round trip along the forward and backward paths; and introducing an oxygen containing gas into the forward path and/or the backward path.

21 Claims, 2 Drawing Sheets

METHOD FOR INTERNAL HEATING REFORMATION BY OXIDATION

CROSS-REFERENCE TO RELATED APPLICATIONS

This application is a Divisional application of application Ser. No. 10/204,199 filed Aug. 16, 2002, issued as U.S. Pat. No. 6,911,187, which is a U.S. National Phase Application under 35 U.S.C. 371 of International Application No. PCT/JP01/01136 filed Feb. 16, 2001, the entire contents of which are hereby incorporated by reference herein.

TECHNICAL FIELD

The present invention relates to a method of making hydrogen by reforming reactions as well as an apparatus for carrying out the method.

BACKGROUND ART

Methods and apparatus in a variety of forms have so far been known to make hydrogen by reforming reactions. The practice with all these conventional methods and apparatus was, however, to derive a heat necessary for reforming reactions, simply from either the sensible heat of a gas burnt outside of the reforming reaction apparatus or a sensible heat generated by a heating medium. As a result, the sensible heat comes to be supplied through the wall surfaces of the reforming reaction apparatus. Not only does this require the apparatus as a whole to be large in size, but also its thermal efficiency is far from being well satisfactory. Furthermore, if a hydrocarbon is used as it typically is methane requiring a heating temperature of 700 to 750° C. for its reforming reactions, such an external heating system while requiring that the wall surfaces of the reforming reaction apparatus be externally heated at a temperature much higher than that temperature has required that they be heated at a temperature below 1000° C. because if the temperature of 1000° C. is exceeded, the material that makes up the wall surfaces tends to deteriorate.

In order to dissolve such inconveniences in the prior art, the present applicant has already proposed in Japanese Patent Application No. 2000-5843 an invention pertaining to an improved reforming reaction or reforming method and apparatus in which as a mixture gas of a hydrocarbon or aliphatic alcohol and water vapor is supplied and contacted with a reforming catalyst, a small amount of oxygen is mixed in the mixture gas of hydrocarbon or aliphatic alcohol and water vapor in an appropriate stage and an oxidation catalyst is added to the reforming catalyst to oxidize a part of the hydrocarbon or aliphatic alcohol and thereby to liberate a heat so that the quantity of heat required for the reforming reaction is internally supplied.

While if an example is taken of the case with a hydrocarbon a temperature of 700 to 750° C. is required to terminate the reforming reactions as an endothermic reaction, it has been found that the improved method in which heat is liberated by the oxidation reaction within a catalyst layer makes it possible to generate a sensible heat sufficient to maintain a temperature of 700 to 800° C. Thus, designed to internally generate the heat and thereby making it possible to maintain a temperature in the range necessary for the reforming reactions, the method makes it possible to render not only the apparatus markedly smaller in size but also the thermal efficiency much higher compared with the prior art that relies on the external heating.

The present invention is a further improvement over the invention mentioned above and is designed to further improve the thermal efficiency. And, it basically utilizes a technical idea found to improve the thermal efficiency of a burning type de-odorizer as disclosed in JP 2000-257837 A (Japanese Patent Application No. H11-59652), and applies the idea to the method of making of hydrogen by reforming reactions to further improve the thermal efficiency in the process.

The present invention is also to provide an apparatus for implementing such a method, the apparatus not only being of an improved thermal efficiency but also being possibly made further smaller in its entire structure.

DISCLOSURE THE INVENTION

In order to achieve the objects mentioned above, the present invention provides a method of reformation which comprises the steps of: preparing a columnar catalytic member containing a reforming catalyst, a shift catalyst and an oxidation catalyst, the columnar catalytic member having a multiplicity of axial passages; preparing a reformable gas having a hydrocarbon or an aliphatic alcohol and water vapor mixed together; rotating the columnar catalytic member while passing the gas therethrough transversely to its cross section in such a manner that the gas first flows along a forward path extending in one direction through a first portion of the axial passages which accounts for nearly one half of the cross section and then flows along a backward path extending in the other direction through a second portion of the axial passages which accounts for nearly the other half of cross section, thereby causing the gas to undergo reforming and shift reactions and thereby to give rise to hydrogen for recovery while the gas makes a round trip along the forward and backward paths; and introducing an oxygen containing gas into the forward path and/or the backward path.

The method designed as mentioned above permits heat to be generated mainly in the backward path by the introduced oxygen gas effecting an oxidation reaction there with the aid of the oxidation catalyst. While the quantity of heat thus generated comes to heat the catalytic member, it follows that the rotation of the catalytic member displaces the heated portion to the forward path side, with the result that this quantity of heat contributes to fresh reforming reactions in the forward path. Consequently, the quantity of heat required for reformation, eventually the quantity of oxygen consumed is made less in the present invention than in the previous invention by the present inventor mentioned before.

The present invention also provides an apparatus for implementing the method mentioned above, which apparatus comprises: a hollow cylindrical frame having its bottom closed; a columnar catalytic member having a multitude of axial passages, mounted in and supported by the cylindrical frame so as to be rotatable relative thereto by a drive means such as an electric motor; a closure means closing an upper end of the cylindrical frame and making a space immediately above the columnar catalytic member; a partition means for subdividing the space into a first and a second independent space; a gas inlet port formed in the closure means for introducing a mixture gas of hydrocarbon or aliphatic alcohol and water vapor into the first space; a hydrogen outlet port formed in the closure means for recovering hydrogen generated from the second space; and an oxygen inlet port for introducing oxygen into a region of the catalytic member, wherein the oxygen inlet port may make further use of the gas inlet port and/or be additionally provided for communication with a closed space at the bottom in the cylindrical frame.

In the apparatus constructed as mentioned above, while the heat of oxidation reaction by oxygen primarily generated in the backward path in the catalytic member tends to heat the backward path region of the catalytic member, the rotation of the catalytic member by the electric motor or the like repeatedly displaces the heated region to lie in the forward path side to make the generated quantity of heat available for fresh reforming reactions of fresh mixture gas replenished in the forward path.

Mention is made in detail below of specific features of the present invention.

While the gas used for the method of the present invention is either a hydrocarbon or aliphatic alcohol, the difference between them in temperature required for reforming reactions makes a large difference between the amounts of an oxidation catalyst used respectively therewith.

In the case of a hydrocarbon, a temperature of 700 to 750° C. is required to accomplish its reforming reactions. In the conventional external heating reformer, the reforming reactions are made to commence when the mixture of the hydrocarbon and water vapor is externally heated to have a temperature of about 500° C. and are virtually finished when the temperature is raised to 700 to 750° C.

Since the reforming reaction is an endothermic reaction, so that the reaction temperature in the reforming catalyst may not fall, enough amount of heat commensurate with the endotherm must be supplied externally in the conventional reformer.

In the method of the present invention, however, the liberation of heat by the oxidation reaction in the catalyst layer generates a sensible heat sufficient to maintain a temperature of about 700 to 800° C. and is thus capable of maintaining a range of temperatures required for the reforming reactions. Thus, if the low temperature hydrogen generated by the reforming reactions tends to bring about a fall in the temperature of the mixture gas of hydrocarbon and water vapor, then oxygen extant in the mixture gas is allowed to react with hydrocarbon again with the aid of the oxidation catalyst in the catalyst layer and thereby to restore the temperature of the mixture gas to about 800° C. so that the reforming reactions may repetitively continue. Thus, in the method of the present invention, a state is created as if a fine and multi-stage catalytic combustion is taking place in the catalyst layer, which largely reduces the needed amount of the reforming catalyst and permits the reformer to be made small in size. The oxidation catalyst should be used contained in an amount that is 2 to 10% (in the case of methane, preferably in a range of 3% plus and minus 2%) of the amount of the reforming catalyst. For the oxidation catalyst, use may be made of any such catalyst that can withstand a temperature as high as mentioned above, although commonly used is a dispersion of platinum, palladium or the like in the reforming catalyst.

On the other hand, an aliphatic alcohol is much lower in reforming temperature than a hydrocarbon and indeed has reforming reactions going on at a temperature as low as 250 to 350° C. Moreover, its small endotherm in reforming reactions makes it sufficient to supply the mixture gas of aliphatic alcohol and water vapor with a reduced amount of oxygen. Consequently, the reformer can be made further smaller in size with an aliphatic alcohol. The proportion of the oxidation catalyst in the case of an aliphatic alcohol may range from 1 to 5% (with methanol, preferably 2% plus and minus 1%) of the amount of the reforming catalyst.

If a reforming catalyst is used having a space velocity (SV), for example, of about 3,000, the use of an oxidation catalyst having a space velocity of about 100,000 may achieve the object, although it is important to ensure that the oxidation catalyst is sufficiently uniformly dispersed in the reforming catalyst. It is then useful to provide a very small layer of the oxidation catalyst in front of the reforming catalyst layer containing the oxidation catalyst to facilitate the initiation of the reactions. Also, to expedite the completion of the reactions it is possible to provide a very small layer of the oxidation catalyst behind the mixed reforming catalyst layer.

Hydrocarbon or aliphatic alcohol supplied into the reforming catalyst layer mixed with the oxidation catalyst reacts with oxygen with the aid of the oxidation catalyst whereby heat is liberated raising the temperature of the mixture gas obtained. The thus heated mixture gas on contacting the reforming catalyst undergoes the reforming reactions, thereby generating hydrogen. As mentioned previously, while the reforming reaction being an endothermic reaction lowers the temperature of the mixture gas, the presence of the oxidation catalyst in the downstream reforming catalyst layer as well permits an unreacted portion of hydrocarbon or aliphatic alcohol to further react with oxygen still extant and thereby to liberate heat. With the temperature of the mixture gas thus maintained in the reaction temperature range, the reforming reactions are allowed to continue successively stepwise until oxygen in the supplied gas is fully consumed. If the thickness of the reforming catalyst layer through which the mixture gas is passed is set up so as to be commensurate with the feed rate of the mixture gas, it is then assured that the reforming reactions are made complete at the exit end of the catalytic layers. In the interest of the protection of environment, however, it is desirable that an acceptable small layer of the oxidation catalyst only be provided at the exit end of the catalytic layers so that there is no residual oxygen there.

The oxidation catalyst and the reforming catalyst may be arranged in layers, one top of the other. These layers may also be used as multiple tiers spaced apart by a perforated support plate between them. It is also possible to use the oxidation and reforming catalysts in the form of a mixed catalytic layer in which they are fully mixed together. As regards the shift catalyst, it is typical to locate a layer thereof above both of the oxidation and reforming catalyst layers so that they may work after the reforming reactions have mostly or at least mostly been concluded. Also, to expedite conclusion of the oxidizing reactions, it is desirable that a layer of the oxidation catalyst only be additionally provided at the uppermost end of the catalytic layers.

In a preferred form of the reaction apparatus, it is desirable to provide between the first space connected to the reformable gas inlet port and the second space connected to the reaction product (hydrogen) gas outlet port a third space narrower than these spaces and a scavenging gas inlet port connected to the third space for introducing a scavenging gas (usually a mixture gas of oxygen and water vapor, including no reformable gaseous component) into it. This arrangement is designed to cause the scavenging gas to act on such a portion of the reformable gas including an unreacted component that is being brought in the backward path from the forward path as the catalytic member is rotated and to drive it out past passages in the catalytic members downwards into the bottom space in the apparatus so that the same reformable gas portion may be reformed by the reforming catalyst in the backward path to conclude the reactions therein.

The SV value suitable for the reactions in the present invention may range between 1,500 and 8,000 for the hydrocarbon and between 2,000 and 8,000 for the aliphatic alcohol.

What can be listed as the hydrocarbon usable includes methane ($CH_4$), ethane ($C_2H_6$), propane ($C_3H_8$), kerosene, gasoline and so forth, although usually used is $CH_4$. Then, the reforming reactions are effected generally at a temperature between 750 and 800° C. And, what can be listed for the aliphatic alcohol includes methanol, ethanol and so forth, although often used is methanol. The temperature of the reforming reactions with the aliphatic alcohol ranges between 250 and 350° C.

The ratio of water vapor to hydrocarbon ($H_2O/C$) normally ranges between 2.5 and 3.5. If hydrocarbon is replaced by aliphatic alcohol, the ratio ($H_2O/C$) usually ranges between 1.5 and 2.

The reforming catalyst that can be used here may be any reforming catalyst that has hitherto been commonly used, although what can be listed as commonly used includes $NiS$—$SiO_2.Al_2O_3$, $WS_2$—$SiO2.Al_2O_3$, and $NiS$—$WS_2.SiO_2.Al_2O_3$. Included as the shift catalyst commonly used are $Fe_2O_3$ and $Fe_3O_4$, but if reactions are to be effected at a temperature of 700° C. or higher, then the use of a particular catalyst such as $Cr_2O_3$ is preferable. The oxidation catalyst should preferably be Pt or Pd, which is hard to deteriorate at an elevated temperature.

BRIEF DESCRIPTION OF THE DRAWINGS

The present invention will better be understood from the following detailed description and the drawings attached hereto showing certain illustrative forms of embodiment of the present invention; in this connection, it should be noted that such forms of embodiment illustrated in the accompanying drawings hereof are intended in no way to limit the present invention but to facilitate an explanation and understanding thereof. In the drawings.

BEST MODES FOR CARRYING OUT THE INVENTION

Hereinafter, an explanation is given in respect of a reforming reactor apparatus that represents a suitable embodiment of the present invention, reference being had to the accompanying drawings.

Figure 1:
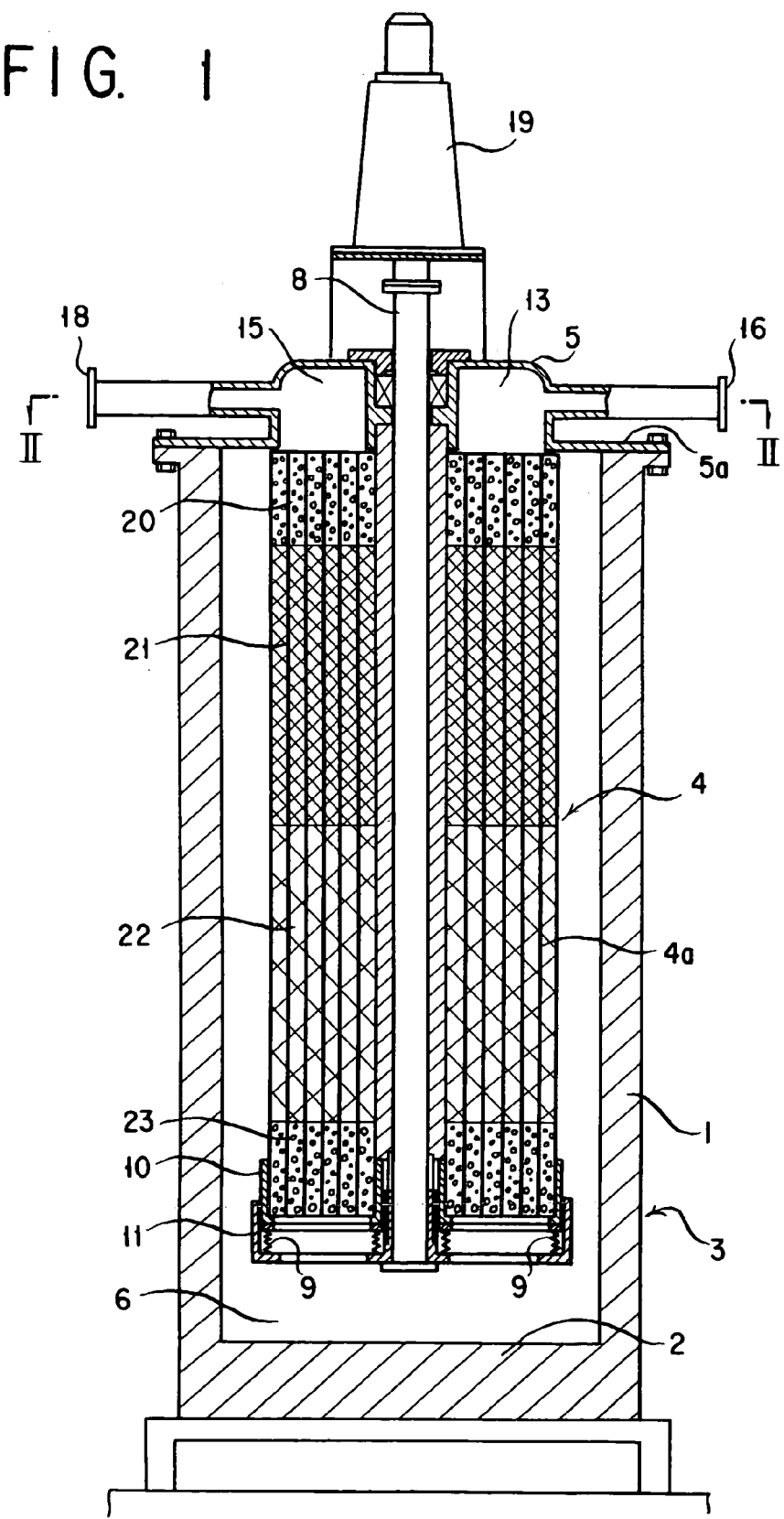
FIG. 1 is a longitudinal cross sectional view illustrating one embodiment of the reforming reactor apparatus according to the present invention.

Referring to FIG. 1, the apparatus includes a hollow cylindrical frame 3 made in the form of a receptacle having a cylindrical peripheral wall 1 and a bottom wall 2 made in the form of a disk. Mounted in the inner space of the cylindrical frame 3 is a columnar catalytic member 4 having a honeycomb structure and its central part supported by a longitudinally extending shaft 8 so that it is rotatable. The honeycomb like catalytic member 4 is made of a honeycomb like passage member 4a whose surfaces have catalysts applied or otherwise attached thereto. The honeycomb like catalytic member 4 has a size that is, for example, 150 to 1000 mm in diameter and then has a height of 600 to 4000 mm that is about 4 times as large as the diameter. The shaft 8 at its upper portion is rotatably supported by a lid body 5 which is attached to the cylindrical frame 3 to close its top, and the shaft 8 is designed to be rotated by a rotation drive unit 19 such as an electric motor disposed above the lid body 5.

The honeycomb like passage member 4a has a structure made up by bundling or tying up in a cylindrical bundle a plurality of honeycomb like passages or passage elements composed of a ceramic or metallic material and open both upward and downward and reinforcing the lower end of the bundle with a supporting frame 10. A coiled spring members 9 is received in a space defined between the underside of the supporting frame 10 and a mounting fixture 11 fastened to the lower end of the supporting shaft 8. The disk portions of the supporting frame 10 and the mounting fixture 11 are both open up and down so that the lower end of the honeycomb like passage member 4a communicates with the lower portion of the inside space of the cylindrical frame 1. While in the embodiment illustrated the supporting shaft 8 is shown supporting the lower end of the honeycomb like passage member 4a and supported rotatably only by the lid body 5 mounted so as to close the top of the cylindrical peripheral wall 1 of the cylindrical frame 3, the cylindrical frame 3 may be made to support the lower end of the shaft 8 with its bottom wall 2 as well.

Mention is made below of examples in size of the honeycombed passage member 4a.

TABLE 1

|  | Ceramic made |  | Metal made |
| --- | --- | --- | --- |
| Number of cells (number) | 400 | 600 |  |
| Area of contact ($cm^2/cm^3$) | 27.8 | 33.0 | 38.8 |
| Open area ratio (%) | 78 | 73 | 90.2 |

* The number of cells indicates the number of holes per 1 square inch.

The term "honeycomb like passage member" is used here for the reason that an individual passage may have a cross section that is polygonal other than hexagonal, or even circular as the case may be, or can even have a sector structure with circumferentially subdivided sectors as the case may be.

Figure 2:
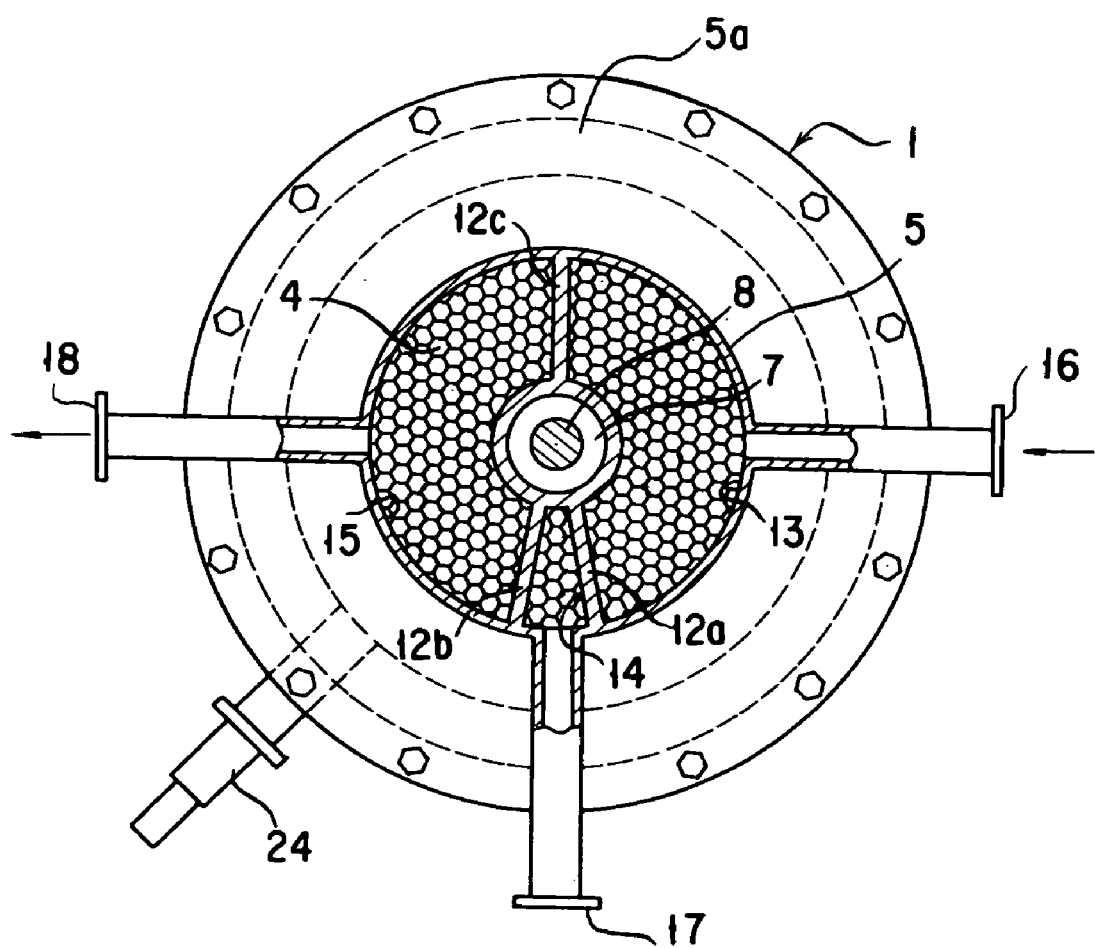
FIG. 2 is a transverse cross sectional view of the apparatus taken along the line II—II in FIG. 1.

The lid body 5 has a portion 5a secured to the peripheral wall 1 of the cylindrical frame 3, whose inner surface is adapted to have a peripheral region of the top of the honeycomb like catalytic member 4 slidably contacted thereto while hermetically sealing the top of the honeycomb like catalytic member 4. The lid body 5 is also bulged upwards immediately above the honeycomb like catalytic member 4 so as to form there a space that communicates with the honeycomb like catalytic member 4. This space as shown in FIG. 2 is subdivided by three partition walls 12a, 12b and 12c radially extending from around the shaft 8 to form three mutually independent chambers, namely a gas inlet chamber 13, a purging or scavenging gas chamber 14 and a product outlet chamber 15, each in communication with the honeycomb like catalytic member 4. It is with the lower ends of the three chambers: the reformable gas inlet chamber 12a, the scavenging gas chamber 12b and the product outlet chamber 12c that a top surface of the honeycomb like catalytic member 4 is made to slidably contact while being hermetically sealed by the lid member 5. Referring to FIG. 2, the inlet chamber 13 and the outlet chamber 15 are shown at the right and left hand sides, respectively, each having its horizontal cross section that is almost semi-circular in size, and the two being connected to the gas inlet port 16 and the gas outlet port 18, respectively. The scavenging chamber 14 is in the form of a fan in cross section that is smaller in cross sectional area than the other chambers, and is provided with a scavenging or purging gas inlet port 17, which is supplied with a scavenging or purging gas that may be water vapor which unexceptionally contains oxygen to feed it into the scavenging chamber 14. Each of the partition walls 12a, 12b and 12c has a wall thickness greater or not less than the right to left width of a single honeycomb cell so that when the partition wall lies on the center of the single honeycomb cell with the rotation of the honeycomb like catalytic member 4 the single honeycomb cell is not exposed to both of the right and left hand side of the partition wall to ensure that the adjoining chambers 13, 14 and 15 are not short-circuited one another via the space above the single honeycomb cell.

The honeycomb like catalytic member 4 in the embodiment illustrated in FIG. 1 comprises a plurality of catalytic layers disposed axially from top towards bottom in the order of a layer of oxidation catalyst 20, a layer of shift catalyst 21, a layer of reforming catalyst 22 and a layer of oxidation catalyst 23.

Mention is next made of the operation of the embodiment constructed as described above.

With the operation initiated, the scavenging chamber 14 is supplied with a scavenging gas such as water vapor unexceptionally containing oxygen from the scavenging gas inlet port 17. A mixture gas of hydrocarbon or aliphatic alcohol and water vapor that may optionally contain oxygen is introduced from the gas inlet port 16 and in flowing downwards through the region of the honeycomb like catalytic member 4 shown in the right hand side in FIG. 1, first comes into contact with the oxidation catalytic layer 20 where a part of oxygen in the gas provides an oxidation reaction, liberating a heat. The heat thus generated furnishes a quantity of heat required for a part of the hydrocarbon and water vapor in the course of passing through the reforming catalytic layer 22 to initiate a reforming reaction. Oxygen still extant in the gas provides an oxidation reaction in the oxidation catalytic layer 23 as the lowermost layer of the right hand side part of the catalytic member 4, thereby liberating a heat again. The gas of hydrocarbon and water vapor having thus in part undergone its reformation and containing oxygen if still extant arrives in the bottom space 6 in the cylindrical frame 3. In the process described above, rotating the honeycomb passage member 4 at a speed of rotation, for example, of 20 rpm causes a portion of the gas before arriving in the bottom space 6 to tend to take its way towards the left half of the catalytic member 4 as shown in FIG. 1. In this embodiment, however, such a portion of the gas tending to head towards the left half is, before it actually reaches the left half, driven out downwards with the scavenging gas introduced via the scavenging chamber 14, shown in FIG. 2, from the scavenging gas inlet port 17 as mentioned above. As a result, it is ensured that the entire gas midway of reformation necessarily arrives in the bottom space 6 in the cylindrical frame 6.

Upon arriving in the bottom space 6 in the cylindrical frame 3, the gas with a residual amount of oxygen under a pressure of the gas continuously introduced through the inlet port 16 is passed upwards through the region of the honeycomb like passage member 4 shown in FIG. 1 as constituting the left hand side part. In this course, a heat is liberated by an oxidation reaction with a residual component of oxygen in the lowermost, oxidation catalytic layer 23 and is then expended to effectively bring about a reforming reaction in the reforming catalytic layer 22 immediately above it. Thereafter, the gas undergoes a shift reaction in the shift catalytic layer 21, and a gas containing hydrogen as the final product of the process is recovered from the gas outlet port 18. A heat is also liberated in the shift reaction. In the meantime, oxygen if still extant in the gas is used to react with an unconverted CO gas in a further oxidation reaction and thereby to produce a $CO_2$ gas in the left hand side uppermost, oxidation catalytic layer 20 as the final catalytic layer in the return path.

In any case, the heat produced by the oxidation reaction and/or by the shift reaction in the left half path in FIG. 1 is used to heat the honeycomb like catalytic member 4. Since rotated, that heated part of the honeycomb like catalytic member 4 turns to the right hand side part, the heat is effectively utilized for the reforming reaction as an endothermic reaction carried out in the right hand side path in FIG. 1.

While a certain arrangement of catalytic layers is shown and described above, it will readily be appreciated by those skilled in the art that this, especially the placement of oxidation layers is merely illustrative and they may be placed at various positions in the paths to the extent that heat can be liberated for effective utilization in reforming reactions.

Also, using a portion of the oxidation catalyst to form an independent oxidation catalytic layer and a remainder oxidation catalyst in mixture with the reforming catalyst to form a reforming or mixture catalytic layer is advantageous in effecting a reforming reaction efficiently.

Further, as the occasion calls for, it is possible to supply water vapor alone from the scavenging gas inlet port 17 and to replenish oxygen into the bottom space 6 from an oxygen inlet port 24 as shown in FIG. 2 connected to the bottom space 6. Then, so replenished with oxygen, the gas under a pressure of the gas continuously through the gas inlet port 16 is passed towards the top space through its path in the honeycomb-like passage member 4 shown at the left hand side in FIG. 1 and in this course the liberation of heat is effected by the oxidation reaction with the replenished oxygen component in the lowermost, oxidation catalyst layer 23.

It is also desirable to range the operating pressure for the reforming reaction between 4 and 11 $kg/cm^2$, and to pass the evolved product gas through an external membrane separator, thereby raising the hydrogen concentration in and removing carbon monoxide from the product gas.

What is claimed is:

1. A method for auto-oxidation, internal heating reformation to produce hydrogen, which comprises:
   preparing a columnar catalytic member containing a reforming catalyst, a shift catalyst and an oxidation catalyst, the columnar catalytic member having a multiplicity of axial passages;
   preparing a reformable gas comprising a hydrocarbon or an aliphatic alcohol, and water vapor mixed together;
   rotating said columnar catalytic member while passing said gas therethrough transversely with respect to a cross-section of the catalyst member such that the gas first flows along a forward path extending in one direction through a first portion of said axial passages which accounts for one part of said cross-section and then flows along a backward path extending in the other direction through a second portion of said axial passages which accounts for another part of said cross-section, thereby causing said gas to undergo reforming and shift reactions to form hydrogen for recovery, while the gas makes a round trip along said forward path and said backward path; and
   introducing an oxygen containing gas into one or both of said forward path and said backward path.

2. The method as set forth in claim 1, wherein said catalytic member has a reforming catalytic layer of said reforming catalyst, a shift catalytic layer of said shift catalyst and an oxidizing catalytic layer of said oxidation catalyst, which are laid one on top of another axially of said columnar catalytic member.

3. The method as set forth in claim 1, wherein said catalytic member has a mixed catalytic layer of said oxidation catalyst and said reforming catalyst, and a shift catalytic layer of said shift catalyst, which are laid one on top of the other axially of said columnar catalytic member.

4. The method as set forth in claim 2, wherein a portion of said oxidation catalyst forms another oxidizing catalytic layer and a remainder of said oxidation catalyst is contained in a mixture with said reforming catalyst.

5. The method as set forth in claim 3, wherein a portion of said oxidation catalyst forms another oxidizing catalytic layer and a remainder of said oxidation catalyst is contained in a mixture with said reforming catalyst.

6. The method as set forth in claim 1, wherein said catalytic member includes an oxidizing catalytic layer as a final catalytic layer in said backward path, whereby before said gas exits said backward path, any unconverted CO gas present therein is selectively oxidized into $CO_2$ with oxygen still extant therein.

7. The method as set forth in claim 2, wherein said catalytic member includes an oxidizing catalytic layer as a final catalytic layer in said backward path, whereby before said gas exits said backward path, any unconverted CO gas present therein is selectively oxidized into $CO_2$ with oxygen still extant therein.

8. The method as set forth in claim 3, wherein said catalytic member includes an oxidizing catalytic layer as a final catalytic layer in said backward path, whereby before said gas exits said backward path, any unconverted CO gas present therein is selectively oxidized into $CO_2$ with oxygen still extant therein.

9. The method as set forth in claim 4, wherein said catalytic member includes an oxidizing catalytic layer as a final catalytic layer in said backward path, whereby before said gas exits said backward path, any unconverted CO gas present therein is selectively oxidized into $CO_2$ with oxygen still extant therein.

10. The method as set forth in claim 5, wherein said catalytic member includes an oxidizing catalytic layer as a final catalytic layer in said backward path, whereby before said gas exits said backward path, any unconverted CO gas present therein is selectively oxidized into $CO_2$ with oxygen still extant therein.

11. The method as set forth in claim 1, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

12. The method as set forth in claim 2, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

13. The method as set forth in claim 3, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

14. The method as set forth in claim 4, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

15. The method as set forth in claim 5, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

16. The method as set forth in claim 6, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

17. The method as set forth in claim 7, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

18. The method as set forth in claim 8, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

19. The method as set forth in claim 9, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

20. The method as set forth in claim 10, wherein said reforming reaction is carried out at an operating pressure of 4 to 11 $kg/cm^2$, and the method further comprises a step of passing an evolved gas through an external membrane separator to increase hydrogen concentration and remove carbon monoxide from the evolved gas.

21. A method as set forth in claim 1, wherein said first portion of said axial passages accounts for approximately one half of said cross-section and said second portion of said axial passages accounts for approximately the other half of said cross-section.

* * * * *